July 10, 1962  S. T. ANDERSON  3,043,999
SUPPLY ARRANGEMENTS FOR SYNCHRONOUS ELECTRIC MOTORS
Filed Nov. 21, 1960
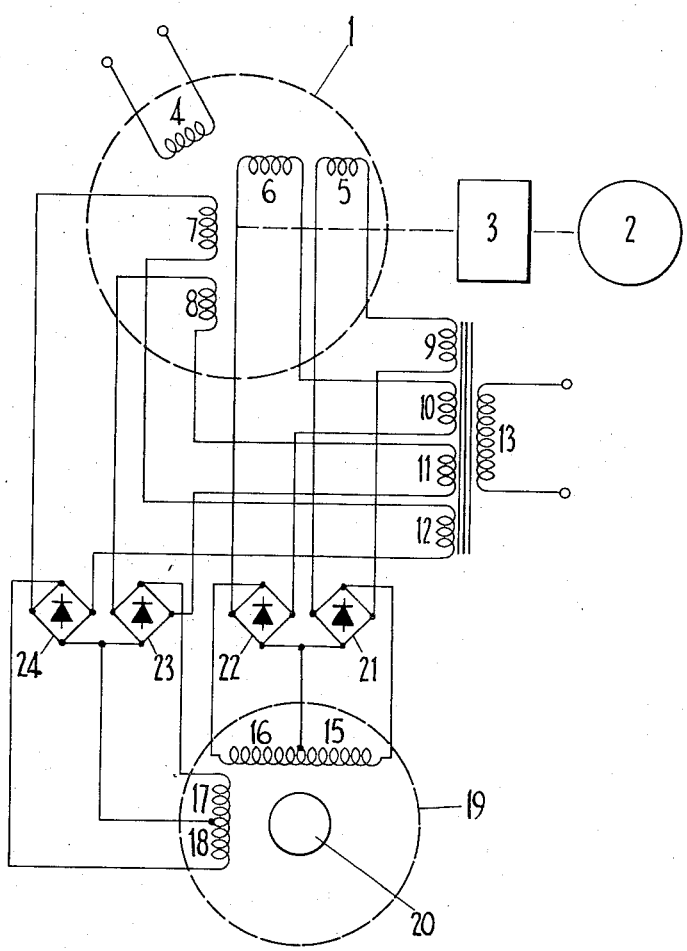
INVENTOR
SIDNEY THOMAS ANDERSON
BY
ATTORNEYS

United States Patent Office 3,043,999
Patented July 10, 1962

3,043,999
SUPPLY ARRANGEMENTS FOR SYNCHRONOUS ELECTRIC MOTORS
Sidney Thomas Anderson, Fawkham, Kent, England, assignor to The General Electric Company Limited, London, England
Filed Nov. 21, 1960, Ser. No. 70,660
Claims priority, application Great Britain Nov. 27, 1959
2 Claims. (Cl. 318—165)

This invention relates to supply arrangements for synchronous electric motors of the kind having stator and rotor components of which one component is provided with a permanent magnet field system or a field system arranged to be energised from a direct current supply preferably independent of the main supply for the motor, and the other component has an even number, at least four, field windings equally spaced about the axis of rotation of the one component, possibly itself, which is arranged to rotate.

For certain applications, such as for the operation of control rod devices in nuclear reactors, it is desirable to have an electric motor drive system which permits of close control of the rotor not only at the rather low speeds of rotation required for certain sequences of operation, but also when it is intended to be held stationary where the requirement is that this should be effected preferably without the application of mechanical brakes to the rotor.

It is an object of the present invention to provide an improved supply arrangement which although simple is especially of use for such drive systems. A further object of the invention is to provide for low speeds of rotation of the rotor of a said synchronous motor while avoiding as much as possible the use of switching contactors and multiplicity of other circuit components.

In a supply arrangement for a synchronous electric motor of the kind specified, in accordance with the invention, (1) the said field windings are connected in series in adjacent pairs, (2) a single-phase-input rotary induction regulator having symmetrical multi-phase output windings which are themselves split into two separate windings, the number of such output windings being at least equal to the number of said pairs of field windings, is arranged in association with sources of separate reference voltages each in phase with the supply to the input of said regulator, the connections being arranged so that in operation the voltages derived from said split pairs of output windings respectively buck and boost their associated reference voltages, (3) pairs of rectifying means are provided for rectifying the pairs of resultant voltages, each said rectifying means being connected to one of the windings of each said pair of field windings, and (4) the interconnections between the said split phase windings and the pairs of field windings are arranged to produce field conditions in the motor which serve to synchronise the position of the rotor component of said motor with that of the induction regulator.

In the same way conditions may be created in which the field in the motor will rotate in synchronism with the movement of the regulator rotor. If the regulator rotor is rotated at low speed then the rotor of the motor will also rotate at low speed. When the regulator is stationary it may be readily arranged that the field induced in the motor is always sufficient positively to locate the rotor of the motor.

It can be seen therefore that the arrangement is in fact ideal for application to the operation of control rods and the like in a nuclear reactor. In such an application, as indeed when desirable for other applications, the motor may be provided with means as described for example in British patent specification No. 822,413, whereby running away of the motor under action of a load on the motor may be controlled in the event of a failure of the main supply to the motor. Thus a closed winding may be provided in one component of the motor to cooperate with the permanent magnet field system or field system which is energised independently of the main supply.

The said sources of reference voltages above referred to are preferably secondary windings of a reference transformer the primary winding of which is arranged to be energised from the same main supply as the induction regulator.

The simplest embodiment of the invention is probably one involving the use of a two phase output rotary induction regulator and such an embodiment will now be described by way of example with reference to the accompanying drawing.

The induction regulator 1 which is adapted to be rotated at any desired speed by suitable means such as a motor 2 through a gear box 3, comprises a single phase input winding 4 for connection to the standard 50-cycle alternating current mains which may also be used to energise the motor 2. The two phases of the output of the regulator are in quadrature and are split into two separate pairs of windings 5, 6 and 7, 8 respectively. These split windings are connected in series with secondary windings 9, 10, 11 and 12 of a main transformer whose primary winding 13 is connected to the common main alternating current supply. The windings 9, 10, 11 and 12 are arranged to give equal voltages and being in phase with the common supply, these voltages may be considered to be reference voltages, and the reference voltages are preferably equal to the maximum voltage which can be derived from the regulator output winding. Each combination of split winding and secondary winding is connected to a full-wave rectifier, which is preferably a dry contact rectifier, and the output of these rectifiers is fed to respective field windings 15, 16, 17 and 18 of a synchronous electric motor 19, whose four-pole permanent magnet rotor is indicated at 20.

The windings 15, 16, 17 and 18 are arranged in pairs such that 15 and 16 constitute one phase of the motor and 17 and 18 another, their physical position being 90° electrical degrees apart as with normal winding practice for a two-phase synchronous motor.

Connections between pairs of windings 5, 6 and 7, 8 and their associated secondary windings 9, 10, 11 and 12 are so arranged that the following conditions hold:

(1) If the voltages in the windings 5 and 6 are in phase with their respective reference voltages, then the voltage in winding 5 boosts the voltage in winding 9 and the voltage in winding 6 opposes that in winding 10, (2) If the voltages in the windings 5 and 6 are 180° out of phase with their respective reference voltages, then the voltage in winding 5 opposes the voltage in winding 9 and the voltage in winding 6 boosts that in winding 10, (3) If the voltages in the windings 7 and 8 are in phase with their respective reference voltages, then the voltage in winding 7 boosts the voltage in winding 12 and the voltage in winding 8 opposes that in winding 11, and (4) If the voltages in windings 7 and 8 are 180° out of phase with their respective reference voltages, then the voltage in winding 7 opposes the voltage in winding 12 and the voltage in winding 8 boosts that in winding 11.

Whether the voltages in the windings 5, 6, 7 or 8 are in phase or out of phase with their respective reference voltages depends upon the connections and upon the position of the rotor of the regulator. The magnitude of the voltages in the windings 5, 6, 7 and 8 varies sinusoidally with rotation of the rotor of the regulator.

The final voltages which are fed to the rectifiers 21, 22, 23 and 24 vary between $(V+v)$ and $(V-v)$, where V is the reference voltage and $v$ is the maximum voltage which can be derived from the output winding of the regulator, and V is preferably equal to $v$. It can be seen that the voltage values and phase relationships of the various windings as the regulator rotates are such as to produce two sinusoidal fields in quadrature both in phase and in physical arrangement, so that the resultant field rotates in synchronism with the rotor of the regulator and remains of constant value. If the rotor is stationary then the resultant field is stationary and being of constant finite value will act to hold the rotor 20 of the motor stationary as well.

If a constant speed of rotation of the motor 19 is required then the rotor of the regulator should be rotated at that constant speed. It is to be observed however that the resultant torque exerted on the rotor 20 can be arranged to remain above some minimum safe value so that even when it is stationary this torque is such that control of the rotor 20 is adequate to retain the desired load on the motor 19 in any position. Thus if the motor is used as in the system of control described in our patent specification No. 822,413, the control rod can be suspended at the end of a winch cable paying-off from a winch drum driven by the motor 19, in any desired position without the necessity for a mechanical brake on the winch drum or driving shaft.

In order to simplify the arrangement, one pair of rectifiers may be reversed, say 23 and 24, and then, by removing the common connection from this pair of rectifiers to the common point of windings 17 and 18 and applying it to the common connection to the other pair of rectifiers while at the same time removing the connection from the common point of windings 15 and 16 to the common point of rectifiers 21 and 22, and applying it to the common point of the windings 17 and 18, a saving of two conductors in the connection between the rectifier housing and the motor 19 is effected.

It is a feature of the arrangements which have been described herein, that a low frequency rotating electromagnetic field is produced with comparatively simple components and, notably, without the use of contactors which could be the source of wear and of trouble due to jamming.

Other advantages and modifications will be apparent to those skilled in the art.

I claim:

1. A supply arrangement for a synchronous electric motor having stator and rotor components of which one component is provided with magnetic field system, and the other component has an even number, at least four, field windings equally spaced about the axis of rotation of the one component which is arranged to rotate, wherein (i) the said field windings are connected in series in pairs, (ii) a single-phase-input rotary induction regulator having symmetrical multi-phase output windings which are themselves split into two separate windings, the number of such output windings being at least equal to the number of said pairs of field windings, is connected with sources of separate reference voltages each in phase with the supply to the input of said regulator, the connections being such that the outputs from said split pairs of output windings respectively buck and boost their associated reference voltages, (iii) pairs of rectifying means are provided for rectifying the pairs of resultant voltages, each said rectifying means being connected to one of the windings of each said pair of field windings, and (iv) the interconnections between the said split phase windings and the pairs of field windings produce field conditions in the motor for synchronizing the position of the rotor component of the motor with that of the induction regulator.

2. A supply arrangement as claimed in claim 1, wherein said sources of reference voltages are secondary windings of a reference transformer, the primary winding of which is energised from the same main supply as the said induction regulator.

No references cited.